United States Patent Office 3,709,981
Patented Jan. 9, 1973

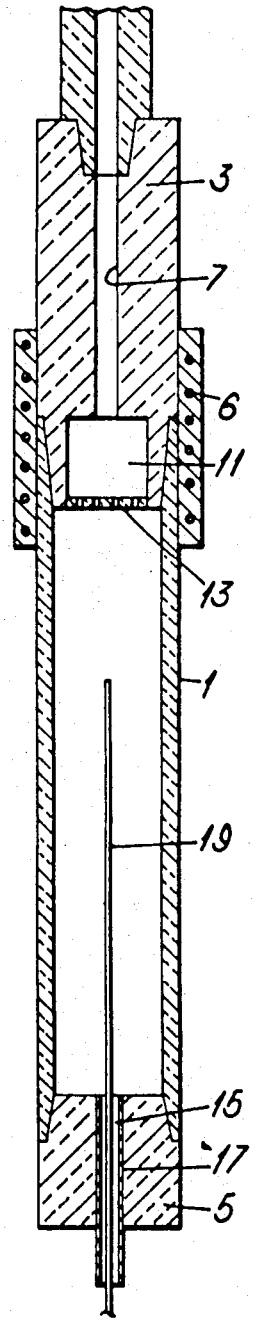
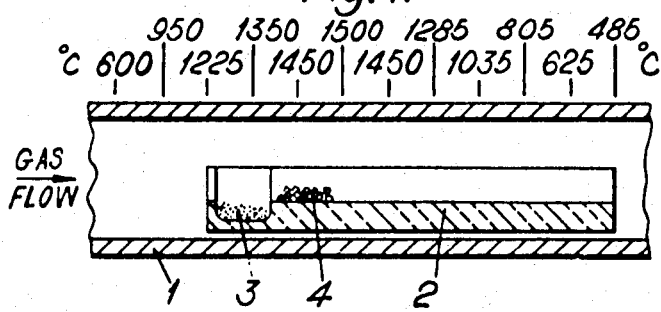
Fig. 1.
Fig. 2.
STEPHEN ARTHUR LEE
CHARLES FREDERICK CARDY
KEITH GEORGE SAMPSON
INVENTORS
BY Jacobs & Jacobs
ATTORNEY

3,709,981
REFRACTORY COMPOUNDS
Stephen Arthur Lee, Dunstable, Charles Frederick Cardy, Luton, and Keith George Sampson, Clophill, England, assignors to Laporte Industries Limited, London, England
Filed Aug. 20, 1970, Ser. No. 65,403
Int. Cl. C01b *31/36;* B01j *17/32*
U.S. Cl. 423—346          7 Claims

ABSTRACT OF THE DISCLOSURE

This invention relates to refractory compounds and specifically to a process of preparing silicon carbide. The process comprises reacting, in a reaction zone, at an elevated temperature silica, elementary carbon, a source of sulphur, hydrogen and a gaseous source of carbon, whereby silicon carbide is formed in a condensation zone. The source of carbon may be a hydrocarbon or carbon monoxide or a carbon/sulphur compound.

---

This invention relates to refractory compounds. In particular it relates to a process of preparing silicon carbide.

According to the present invention, there is provided a process for the preparation of silicon carbide comprising reacting, in a reaction zone, at an elevated temperature silica, elementary carbon, a source of sulphur, hydrogen and a gaseous source of carbon, whereby silicon carbide is formed in a condensation zone.

Suitably the gaseous source of carbon may be one or more hydrocarbons. Preferred hydrocarbons are saturated or unsaturated aliphatic hydrocarbons, especially the lower members of the aliphatic hydrocarbon series, of which methane, ethane, propane, ethylene and acetylene provide particular examples. Members of the alicyclic or aromatic hydrocarbon series may, if desired, be used. Suitable alicyclic and aromatic hydrocarbons include cyclohexane or hydrocarbon derivatives thereof, benzene, toluene and xylene. Hydrogen can be produced in certain circumstances from the cracking of the hydrocarbons.

Sources of carbon other than hydrocarbons may be used. Thus, carbon monoxide has been found to be an especially advantageous source of carbon in the process of the present invention in that high yields of silicon carbide may be obtained.

The source of carbon may also be a source of sulphur. Organic sulphur compounds are suitable for use as sources both of carbon and sulphur. Mercaptans and sulphides are preferred for this purpose, but carbon disulphide may also be used.

Hydrogen can be produced in certain circumstances from the cracking of these organic sulphur compounds. Other suitable sources of sulphur include silicon sulphides and elementary sulphur itself. A preferred source of sulphur is hydrogen sulphide.

Conveniently, any gaseous reactants, or any reactants gaseous at the elevated temperature of the reaction, are passed over any solid reactants in the reaction zone. Thus the other reactants are conveniently passed over silica and elementary carbon in the reaction zone. Advantageously the silica is in finely divided form for the most intimate contact between the gaseous reactants and the silica. The elementary carbon may be in a finely divided form intimately mixed with the silica or may be constituted by the material of the reaction zone.

The elevated temperature at which the reaction is conducted is generally between 1350° C. and 1800° C. preferably between 1450° C. and 1650° C.

The process of the invention may be carried out at atmospheric pressure or if desired at reduced pressure or at elevated pressure.

The rate of formation and deposition of the silicon carbide product is dependent on the velocity of the gases passing through the reaction zone. Conveniently, the space velocity is within the range 15 to 2000 cm./min., and advantageously within the range 25 to 1250 cm./min. Preferably the range of space velocities is 40 to 750 cm./min. If required, an inert gas, for example argon, may be present to dilute the reactants or to adjust the space velocity to any desired value.

Deposition of silicon carbide may be effected by the provision of a cooler deposition or condensation zone, to which zone the exit gases from the reaction zone are passed. In general, the temperature of the condensation zone will be at least 50° C. below, usually several hundred degrees below, the temperature of the reaction zone. For example, where the temperature of the reaction zone is between 1450° C. and 1650° C., the temperature of the condensation zone may suitably be between 1000° C. and 1550° C.

Deposition of silicon carbide, particularly in the form of whiskers or fibres, is further facilitated by the provision of a suitable substrate, such as carbon, alumina, mullite or silicon carbide, on which growth of the silicon carbide crystals may take place. Conveniently a carbon substrate may be provided by constructing or lining that part of the apparatus in which the condensation zone is located, with carbon. Where, in the gaseous mixture, a hydrocarbon is employed, the carbon resulting from any pyrolysis of the hydrocarbon may constitute the substrate on which growth of silicon carbide crystals can occur.

The present invention is particularly applicable to the preparation of silicon carbide whiskers.

Such whiskers find uses as reinforcements for plastics materials and metals.

In order that the present invention may more readily be understood, the apparatus used is described with reference to the drawings wherein FIG. 1 is an axial section through a horizontal tube reactor, and FIG. 2 is an axial section through a vertical tube reactor.

Referring now to FIG. 1, the reactor comprises a horizontal alumina tube 1 of length 30 cms. and cross-sectional area 2.1 cm.² The tube is located within a furnace (not shown). Within the tube 1 is a graphite liner or boat 2 having a groove 3 within which is placed silicon sulphide 3 and silica chips 4.

In use the tube was heated while passing argon through it until a maximum temperature of 1500° C. was reached with a temperature profile as shown. The reaction gas mixture was then passed through the tube.

Referring now to FIG. 2, the reactor, which is more specifically described in copending application Ser. No. 66,196, filed Aug. 24, 1970, comprises a graphite tube 1, carrying at its upper end a graphite reactor head 3 and at its lower end a graphite gas outlet head 5. Extending through the reactor head 3 is an axial passage 7, counterbored at its lower end to provide a cylindrical cavity or reaction zone 11 which is closed by a perforated graphite disc 13. The cavity 11 is heated by a heater 6. The outlet head 5 has an axial passage 15 housing an alumina tube 17. For some experiments a probe 19 is used to introduce further gas.

The invention is further illustrated by the following examples:

EXAMPLE 1

The apparatus used was as described with reference to FIG. 1.

The reaction gas mixture comprised, by volume, 10% carbon monoxide, 30% hydrogen, 60% argon and was passed through the tube at a rate of 50 ml./min. measured at 1 atm. and 20° C. The space velocity in the reaction zone was about 300 cm./min. After one hour argon was substituted for the gas mixture and the tube was allowed to cool.

In one run, silicon disulphide was employed, and a yield of 42% of silicon carbide whiskers, based on silicon sulphide reacted, was obtained. In a second run, silicon monosulphide was employed, and a yield of 21%, based on silicon sulphide reacted, was obtained. In a third run, no silicon sulphide was used and no silicon carbide was obtained, thus proving that sulphur is essential. In a fourth run, no silica was present and no silicon carbide was obtained, thus proving that silica is essential, even in the presence of silicon disulphide.

EXAMPLE 2

The apparatus of FIG. 2 was used.

In this apparatus the cylindrical cavity 11 was partially filled with 10 gms. of silica chips (natural quartz). Argon was passed through the apparatus whilst the reaction zone was heated to 1550° C. and the condensation zone was heated to 1400–1100° C., the higher temperature being nearer the reaction zone. When temperature equilibration was obtained, the argon supply was stopped and was replaced by a gas mixture composed of 60 mls./min. hydrogen sulphide, 30 mls./min. carbon monoxide and 90 mls./min. hydrogen, the gas volumes being measured at 20° C. and 1 atmosphere pressure. The space velocity in the reaction zone was about 350 cm./min. After 20 minutes reaction, the condensation zone contained 0.13 gm. of a fibrous product, comprising silicon carbide whiskers of diameter less than 1 micron and length up to 5 mm. This weight of product is equivalent to a 20% yield on the basis of the silica transported from the reaction zone.

EXAMPLE 3

Using the same apparatus and conditions as for Example 2 but using a gas mixture composed of 15.5 ml./min. hydrogen sulphide, 90 mls./min. carbon monoxide and 30 mls./min. hydrogen (gas volumes measured at 20° C. and 1 atmosphere pressure) a 20 minute reaction time gave 0.07 gm. of fibrous product in the condensation zone, the product comprising silicon carbide whiskers of diameter less than 1 micron and length up to 5 mm. The space velocity in the reaction zone was about 250 cm./min. This weight of whiskers is equivalent to a 10% yield on the basis of the silica transported from the reaction zone.

We claim:

1. A process for the preparation of silicon carbide whiskers which comprises flowing a gas comprising
   (i) a source of sulphur selected from the group consisting of vaporized elemental sulphur, mercaptans, organic sulphides, carbon disulphide, hydrogen sulphide and silicon sulphides;
   (ii) a source of hydrogen selected from the group consisting of elemental hydrogen, said hydrogen sulphide and hydrocarbons; and
   (iii) a gaseous source of carbon selected from the group consisting of said mercaptans, said organic sulphides, said carbon disulphides, said hydrocarbons and carbon monoxide;
   (a) through a reaction zone comprising solid silica and elemental carbon at a space velocity of from 40 to 750 cm./min. and at a temperature of from 1450 to 1650° C. and (b) into a cooler deposition zone in which said whiskers are deposited.

2. The process of claim 1, wherein the gaseous source of carbon is a hydrocarbon or carbon monoxide.

3. The process of claim 1, wherein the gaseous source of carbon is also a source of sulphur.

4. The process of claim 3, wherein the gaseous source of carbon and sulphur is a mercaptan or organic sulphide.

5. The process of claim 1, wherein the source of sulphur is hydrogen sulphide.

6. The process of claim 1, wherein the gas flowed through the reaction zone includes an inert gaseous diluent to control the space velocity.

7. The process of claim 1, wherein the temperature of the condensation zone is at least 50° C. below that of the reaction zone.

References Cited

UNITED STATES PATENTS

| | | | |
|---|---|---|---|
| 3,290,181 | 12/1966 | Sirtl | 23—208 A X |
| 3,335,049 | 8/1967 | Pultz | 23—208 A X |
| 3,306,705 | 2/1967 | Leineweber et al. | 23—208 A |
| 3,371,995 | 3/1968 | Pultz | 23—208 A |

MILTON WEISSMAN, Primary Examiner